(12) United States Patent
Zajkowski et al.

(10) Patent No.: US 7,739,165 B2
(45) Date of Patent: Jun. 15, 2010

(54) METHOD AND SYSTEM FOR ISSUING CONVERTIBLE PREFERRED SECURITIES

(75) Inventors: Jeffrey J. Zajkowski, Short Hills, NJ (US); Gautam Sareen, New York, NY (US); David A. Seaman, Short Hills, NJ (US); Wenyan Winston Ma, New York, NY (US)

(73) Assignee: JPMorgan Chase Bank, New York, NY (US)

( * ) Notice: Subject to any disclaimer, the term of this patent is extended or adjusted under 35 U.S.C. 154(b) by 1039 days.

(21) Appl. No.: 11/144,573

(22) Filed: Jun. 3, 2005

(65) Prior Publication Data

US 2006/0277125 A1 Dec. 7, 2006

(51) Int. Cl.
*G06Q 40/00* (2006.01)
(52) U.S. Cl. .......................................... 705/35; 705/37
(58) Field of Classification Search ...................... 705/1, 705/35, 68, 410, 400, 2, 36, 37, 45, 7, 80, 705/26; 235/379; 709/224; 324/659
See application file for complete search history.

(56) References Cited

U.S. PATENT DOCUMENTS

| | | | |
|---|---|---|---|
| 4,588,192 A | 5/1986 | Laborde | |
| 4,648,038 A | 3/1987 | Roberts et al. | |
| 6,205,433 B1 | 3/2001 | Boesch et al. | |
| 6,263,321 B1 * | 7/2001 | Daughtery, III | 705/36 R |
| 6,381,585 B1 | 4/2002 | Maples et al. | |
| 6,598,028 B1 * | 7/2003 | Sullivan et al. | 705/36 R |
| 7,219,079 B2 | 5/2007 | Birle, Jr. et al. | |
| 7,246,094 B1 | 7/2007 | Butcher | |
| 7,257,555 B1 | 8/2007 | Farr | |
| 7,257,556 B1 | 8/2007 | Rifkin | |
| 2002/0087373 A1 * | 7/2002 | Dickstein et al. | 705/7 |
| 2003/0023536 A1 | 1/2003 | Hollerman | |
| 2003/0028467 A1 | 2/2003 | Sanborn | |
| 2003/0050884 A1 | 3/2003 | Barnett | |
| 2003/0074300 A1 | 4/2003 | Norris | |
| 2003/0120578 A1 | 6/2003 | Newman | |
| 2003/0158809 A1 | 8/2003 | Carney et al. | |
| 2004/0098327 A1 | 5/2004 | Seaman | |
| 2004/0117282 A1 | 6/2004 | Green et al. | |
| 2004/0162774 A1 * | 8/2004 | Golden | 705/36 |
| 2004/0199442 A1 * | 10/2004 | Haberle | 705/35 |
| 2005/0055303 A1 * | 3/2005 | Routtenberg | 705/37 |
| 2005/0075976 A1 | 4/2005 | Woodruff et al. | |
| 2005/0086148 A1 | 4/2005 | Woodruff et al. | |
| 2005/0102206 A1 | 5/2005 | Savasoglu et al. | |

(Continued)

OTHER PUBLICATIONS

Michael J. Fleming and Kenneth D. Garbade. The Repurchase Agreement Refined: GCF Repo. Jun. 2003. Federal Reserve Bank of New York. vol. 9, No. 6, pp. 1-7.

(Continued)

*Primary Examiner*—James P Trammell
*Assistant Examiner*—John H Holly
(74) *Attorney, Agent, or Firm*—Lowenstein Sandler PC

(57) ABSTRACT

A financial instrument with two parts sold as a unit, comprising a preferred security in a company that is issued directly by the company; and a warrant to buy a common security in the company, wherein the instrument includes a redemption right that is exercisable by the company on both the preferred security and the warrant.

17 Claims, 5 Drawing Sheets

U.S. PATENT DOCUMENTS

| | | |
|---|---|---|
| 2005/0160034 A1 | 7/2005 | Woodruff et al. |
| 2006/0117303 A1 | 6/2006 | Gizinski |
| 2007/0106588 A1 | 5/2007 | Kulak |

OTHER PUBLICATIONS

Yoko Shibata, Repos provide Yanks with niche in Japan. Global Finance. Aug. 1994, vol. 8, Issue 8, pp. 17-22.

Ron Morrow. Repo, reverse repo and securities lending markets in Canada. Bank of Canada Review. Winter 1994/1995 pp. 61-72.

Barron's Dictionary of Finance and Investment terms. Fifth Edition. Copyright 1998 p. 60.

Frank Souder. The US repo and securities lending markets. International Securities Lending 1995-1996. pp. 225-227.

Repos rising. International Finance Law Review. London 2007, p. I.

PSA has guidelines for CMO repos. National mortgage news. New York, Jan. 29, 1996, vol. 20 issue 17, p. 12.

Brad Finkelstein. Chase starting commercial MBS unit. National mortgage news. New York. Sep. 18, 1995, vol. 19, issue 48 pp. 1-4.

TCAM's new sec lending and repo system. International securities lending. London. Fourth quarter 1995. p. 7.

Jennifer Ablan. Deutsche Bank Unit Launches Web Site for Research, Convertible-Bond Trading. Wall Street Journal (eastern ed.) NY, NY. Sep. 18, 2000, p. C15.

* cited by examiner

METHOD AND SYSTEM FOR ISSUING CONVERTIBLE PREFERRED SECURITIES

BACKGROUND

The invention relates to the field of securities and financing, and more particularly to combining multiple types of instruments to achieve certain advantages.

A number of financial instruments are known and used to raise funds. Each of these known instruments has certain advantages and disadvantages. A financial instrument is needed that can be used to raise funds that provides tax and balance sheet advantages, as well as a system and method for issue and redemption of the financial instrument.

The preceding description is not to be construed as an admission that any of the description is prior art relative to the present invention.

SUMMARY OF THE INVENTION

In one aspect, the invention provides a financial instrument with two parts sold as a unit, comprising a preferred security in a company that is issued directly by the company, and a warrant to buy a common security in the company. The instrument includes a redemption right that is exercisable by the company on both the preferred security and the warrant.

In one aspect, the preferred security is perpetual. In one aspect, the preferred security is non-cumulative. In one aspect, the preferred security is cumulative. In one aspect, the instrument further includes terms requiring payment of a warrant strike price by a holder of the instrument upon redemption of the instrument. In one aspect, payment of the warrant strike price occurs if the holder of the instrument exercises the warrant. In one aspect, the instrument further includes terms requiring payment of a preferred call price by an issuer of the instrument. In one aspect, the holder of the instrument receives the common security. In one aspect, the instrument further includes terms requiring payment of a warrant call price to a holder of the instrument upon redemption of the instrument. In one aspect, payment of the warrant call price occurs if the holder of the instrument does not exercise the warrant. In one aspect, the instrument further includes terms requiring payment of a preferred call price by an issuer of the instrument. In one aspect, the holder of the instrument receives cash.

In one aspect, the invention provides a system and method for raising funds comprising issuing a financial instrument with two parts as a unit. The two parts include a preferred security in a company that is issued directly by the company, and a warrant allowing a holder of the warrant to buy a common security in the company. The instrument includes a redemption right that is exercisable by the company on both the preferred security and the warrant. The invention further provides for redeeming the financial instrument after issue, and receiving a warrant strike price from a holder of the instrument.

In one aspect, receiving the warrant strike price occurs a predetermined number of days after redeeming the instrument. In one aspect, the system and method further comprise paying a preferred call price to the holder. In one aspect, paying the preferred call price occurs a predetermined number of days after receiving the strike price. In one aspect, the system and method further comprise issuing the common security in the company to the holder. In one aspect, the system and method further comprise retiring the preferred security.

In one aspect, the invention provides a system and method for raising funds comprising issuing a financial instrument with two parts as a unit. The two parts include a preferred security in a company that is issued directly by the company, and a warrant allowing a holder of the warrant to buy a common security in the company. The instrument includes a redemption right that is exercisable by the company on both the preferred security and the warrant. The invention further provides for redeeming the financial instrument after issue, and paying a warrant call price to a holder of the instrument.

In one aspect, paying the warrant call price occurs a predetermined number of days after redeeming the instrument. In one aspect, the system and method further comprise paying a preferred call price to the holder. In one aspect, paying the preferred call price occurs a predetermined number of days after paying the warrant call price. In one aspect, the system and method further comprise retiring the preferred security.

The foregoing specific aspects are illustrative of those which can be achieved, and are not intended to be exhaustive or limiting. Thus, the objects and advantages of this invention will be apparent from the description herein or can be learned from practicing the invention, both as embodied herein or as modified in view of any variations which may be apparent to those skilled in the art. Accordingly, the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

In the various embodiments disclosed below, a financial instrument is described that includes two parts. One part of the instrument is a preferred security of an issuing company, and the other part of the instrument is a warrant to buy common stock of the issuing company. The preferred security and the warrant are issued together in what will be called for convenience a Net Equity Option Preferred or "NEO Preferred." The NEO Preferred includes a redemption right that allows the issuer to call the instrument. In one embodiment, the NEO Preferred is not redeemable by the issuer during an initial period, such as 5 years. If the issuer redeems the NEO Preferred, the investor or holder of the NEO Preferred has a period of time during which they may exercise the warrant to buy common shares of the issuing company by tendering the warrant strike price along with the warrant to the issuing company. If the investor or holder of the NEO Preferred does not exercise the warrant after the issuer redeems the instrument, then the issuer pays the holder or investor a warrant call price. Regardless of whether the warrant is exercised or not exercised, at a later date, the issuer pays the investor or holder a preferred call price, and the preferred is retired. These features are illustrated in the figures, and described in greater detail below.

An Example System

Figure 1:
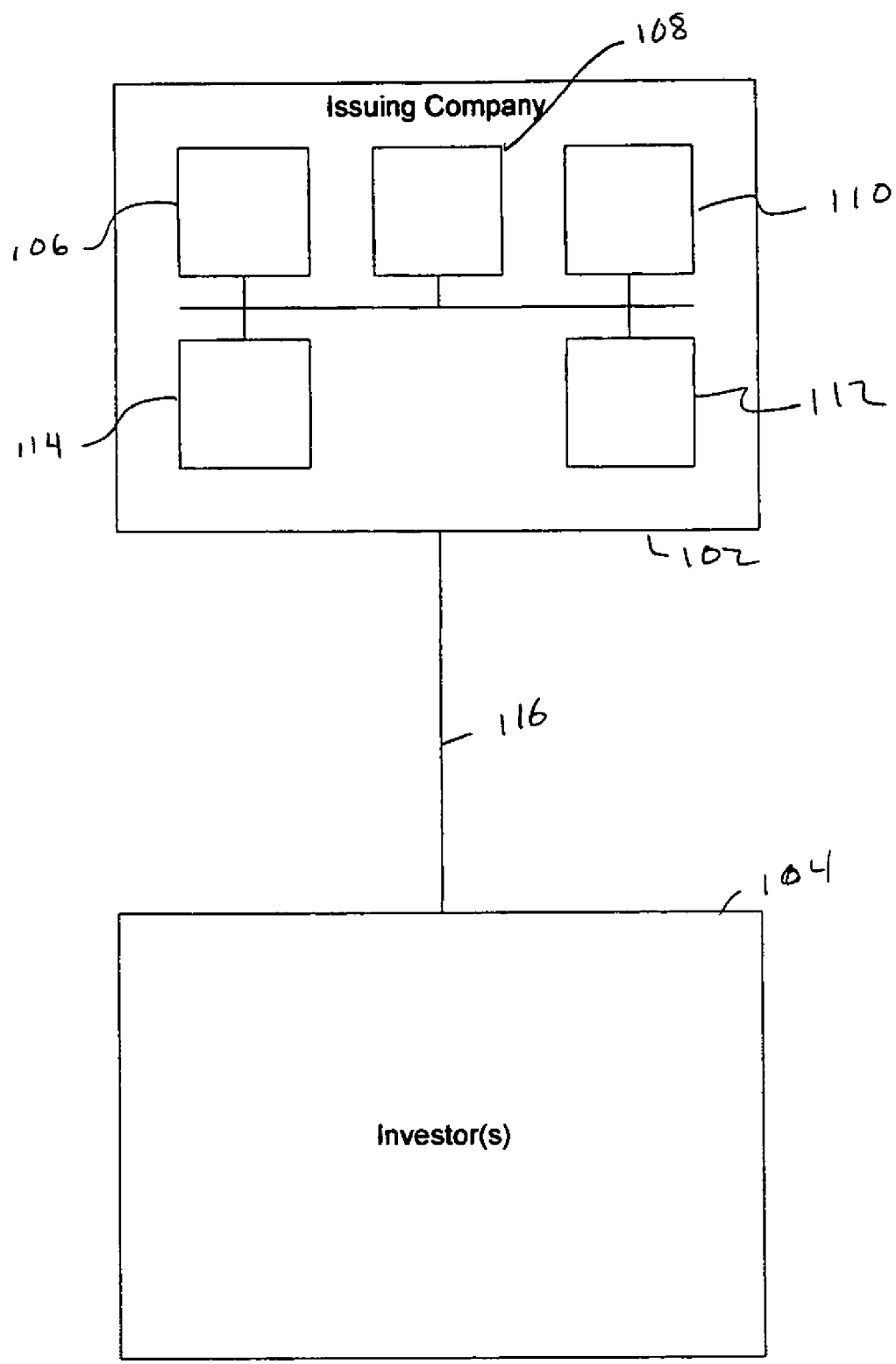
FIG. 1 illustrates a system according to one embodiment.

Referring to FIG. 1, system 100 according to one embodiment includes an issuing company 102 and investor(s) 104. Issuing company 102 includes computers with a central processing unit or CPU 106, memory (RAM, ROM, etc.) 108, input/output devices (keyboards, displays, printers, etc.) 110, fixed and removable storage (hard drive, floppy drive, optical drive, etc.) 112, and network interface devices (modems, ethernet cards, wifi cards, etc.) 114. Although not illustrated, investor(s) 104 also include a central processing unit or CPU 106, memory (RAM, ROM, etc.) 108, input/output devices (keyboards, displays, printers, etc.) 110, fixed and removable storage (hard drive, floppy drive, optical drive, etc.) 112, and network interface devices (modems, ethernet cards, wifi cards, etc.) 114. Issuing company 102 and investor(s) 104 are interconnected by a network (LAN, WAN, intranet, extranet, the Internet, etc.) 116. The disclosed components of system 100 are not particular, and variations and equivalents are envisioned.

An Example Method

Figure 2:
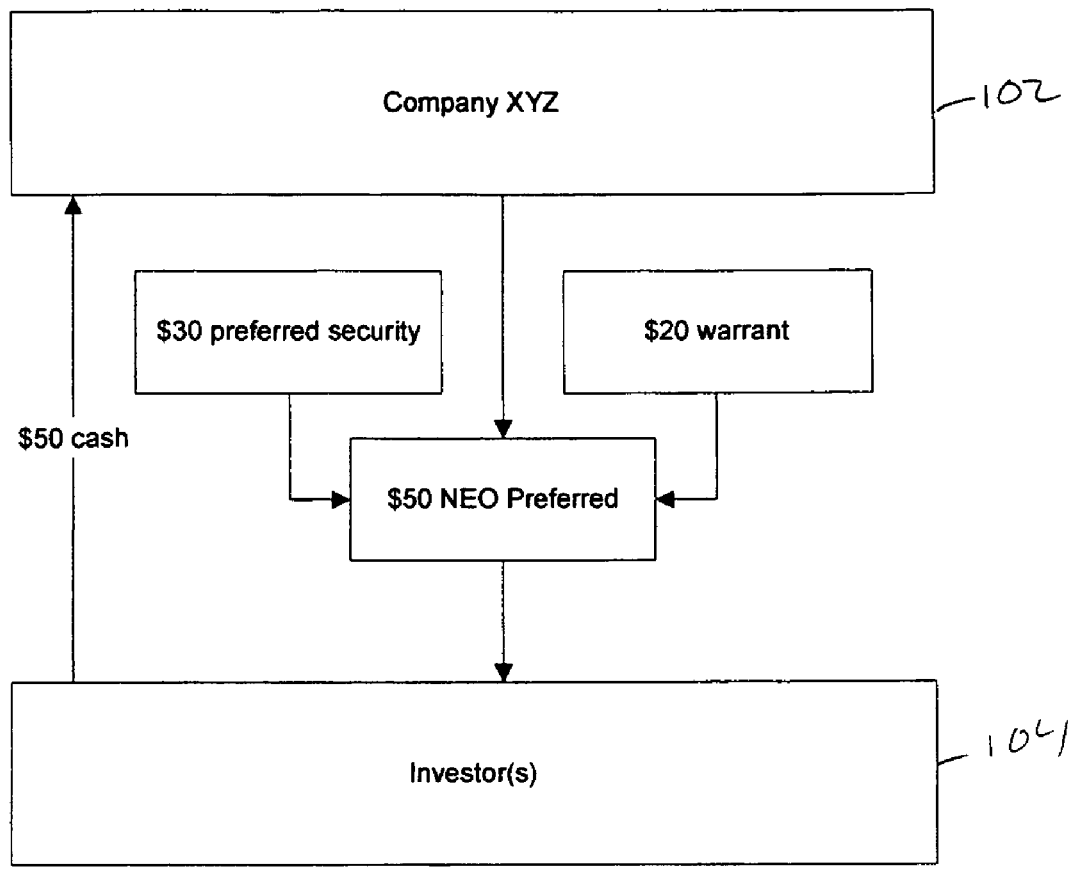
FIG. 2 illustrates a relationship between parties in one embodiment.

Referring now to FIG. 2, in an example embodiment, company 102 issues NEO Preferred financial instruments to investors 104, and receives $50.00 cash in return for each instrument. The NEO Preferred financial instrument includes a preferred security and a warrant. In the example, the value of the preferred security is $30.00 and the value of the warrant is $20.00. The combined value of the preferred security and the warrant equals the $50.00 that is received in cash from the investor.

As known in the financial industry, a warrant is a derivative security that gives the holder a right to purchase securities (usually equity) from the issuer at a specific price within a certain time frame. A warrant is different from a call option, and one main difference is that a warrant is issued and guaranteed by the issuing company, whereas a call option is an exchange instrument and is not issued by the company. In another difference, the lifetime of a warrant is often measured in years, while the lifetime of a typical call option is measured in months.

A preferred security is a fixed income security that is issued by a private or public corporation and that possesses characteristics of both debt and preferred stock. Preferred securities rank above preferred stock but below subordinated debt and will typically pay a fixed coupon rate. This means that the stated dividend or coupon rate must be paid before dividends to common stock holders. Most preferred securities have a stated maturity date.

Preferred securities can be perpetual, which means that they are issued without a maturity date but offer fixed dividend payments. Perpetual preferred securities typically have call protection for the first five years.

Preferred securities can be cumulative, or non-cumulative. A cumulative preferred security will accumulate dividends from one dividend period to the next. If a dividend is not paid in a period, a non-cumulative preferred security will not accumulate dividends from one dividend period to the next.

Convertible preferred securities are another form of preferred securities, which provides an option to convert preferred shares into common shares.

Preferred securities, whether they are perpetual, cumulative or non-cumulative, are generally issued directly by a company.

Trust preferred securities are another known form of preferred security. Banks sometimes use trust preferred securities because they are treated as debt for tax purposes, but count as Tier I capital, within limits, for regulatory purposes. Issuing trust preferred securities does not reduce an existing shareholder's ownership interest, because issue of a trust preferred security is like borrowing.

In order for a bank to take advantage of trust preferred securities, the bank creates a special purpose vehicle ("SPV"). The bank has an ownership interest in the SPV, and the SPV issues the trust preferred securities to investors. The SPV takes the proceeds from issue of the trust preferred securities and loans the funds to the bank. The bank issues debt notes as evidence of its indebtedness to the SPV.

As discussed elsewhere in greater detail, the embodiments of the invention differ from trust preferred securities. In one difference, trust preferred securities have a maturity date, while in one embodiment of the invention the instrument is perpetual. In another difference, the trust issues the trust preferred securities, while in one embodiment of the invention the company itself issues the instrument. In another difference, the trust can suspend payments only up to five years, while in one embodiment of the invention the payments can be suspended for longer than 5 years.

Figure 3:
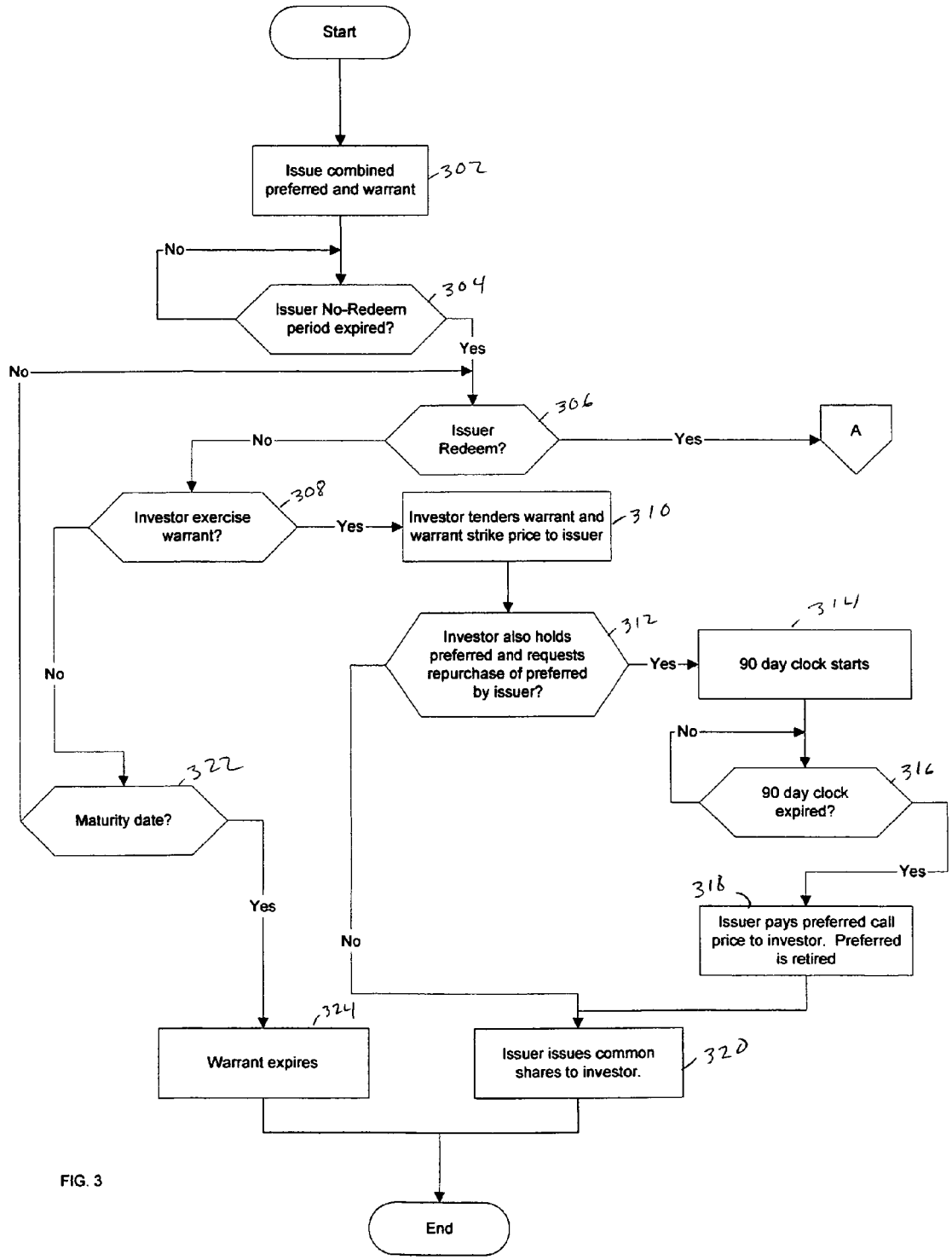
FIG. 3 illustrates steps in a method according to one embodiment.

Referring to FIG. 3, at step 302, company 102 issues the NEO Preferred instrument. As discussed above, the NEO Preferred instrument includes a preferred security and a warrant. Under the terms of the NEO Preferred, the issuing company is not able to redeem the instrument during an initial no-redemption period, which is typically the first 5 years after issue. This is represented by step 304, where the methods loops until the issuer no-redeem period expires.

Figure 4:
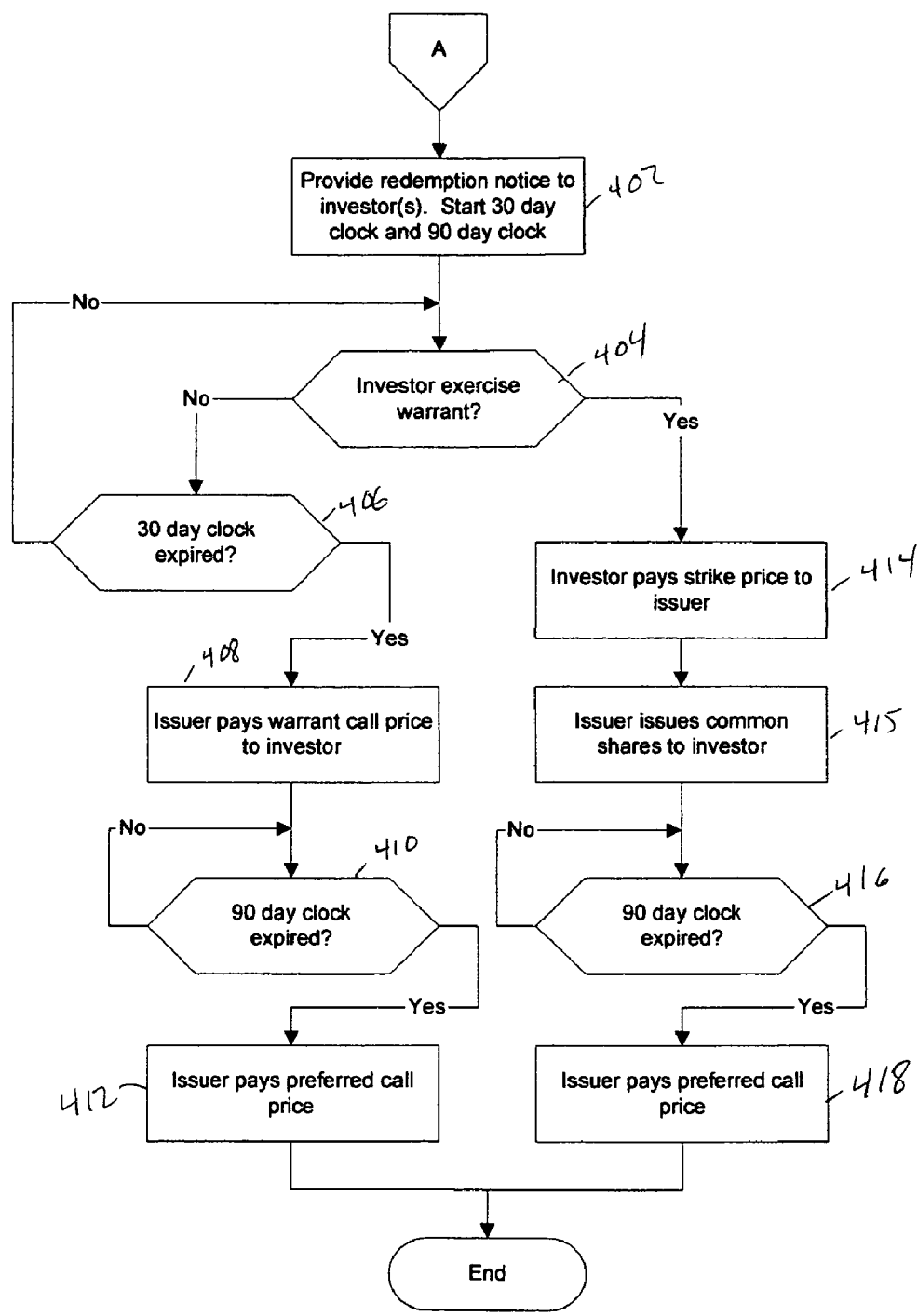
FIG. 4 illustrates steps in a method according to one embodiment.

Once the issuer no-redeem period expires, then at step 306, system 100 determines whether issuing company 102 has started the redemption process for the instrument, and if so, executes step 402 of FIG. 4.

If at step 306, system 100 determines that issuing company 102 has not started the redemption process for the instrument, then at step 308, system 100 determines whether investor 104 has exercised the warrant.

If system 100 determines at step 308 that the investor has exercised the warrant, then at step 310, investor 104 tenders the warrant strike price and warrant to issuing company 102.

In one embodiment, the preferred security and the warrant of the NEO Preferred can be separated after issue. At step 312, system 100 determines whether the holder of the warrant also holds the preferred security (i.e., the holder has not separated the warrant and the preferred security). If the holder of the warrant also holds the preferred and wants to take advantage of the remarketing terms of the NEO Preferred, which returns the value of the warrant strike price to the holder and retires the preferred security, then at step 314, a 90 day clock starts.

At step 316, system 100 determines whether the 90 day clock has expired. If not, system 100 loops to step 316. If so, then at step 318, issuer 102 pays the preferred call price to investor 104, and the preferred is retired. In one embodiment, the preferred call price and the warrant strike price are the same amount. This means that the holder of the warrant tenders the warrant strike price ($30.00) to exercise the warrant, and then 90 days later the issuer pays the holder the preferred call price ($30.00), which effectively cancels the two amounts.

At step 320, issuer 102 issues common shares to investor 104, and the warrant is retired.

If at step 312, system 100 determines that investor 104 does not also hold the preferred security or does not want to remarket the preferred security, then at step 320, issuer 102 issues common shares to investor 104, and the warrant is retired.

If at step 308, system 100 determines that investor 104 has not exercised the warrant, then at step 322, system 100 determines whether the warrant maturity date has been reached. If not, system 100 loops to step 306. If so, then at step 324, the warrant expires.

As discussed above, if at step 306 system 100 determines that issuing company 102 has started the redemption process for the instrument, then at step 402 of FIG. 4, issuing company 102 provides notice of the redemption to investors 104, and two time clocks start. One clock runs for 30 days, and the other clock runs for 90 days.

At step 404, system 100 determines whether investor 104 has exercised the warrant, and if not, at step 406, system 100 determines whether the 30 day clock has expired. If the 30 day clock is still running, system 100 loops to step 404.

If, at step 406, system 100 determines that the 30 day clock has expired without investor 104 exercising the warrant, then at step 408, issuing company 102 pays a warrant call price ($20.00 in the example) to investor 104. At step 410, system 100 then determines whether the 90 day clock is still running, and if so, system 100 loops to step 410. If system 100 determines that the 90 day clock has expired at step 410, then at step 412 issuing company 102 pays investor 104 a preferred call price ($30.00 in the example).

If, at step 404, investor 104 exercises the warrant, then at step 414, investor 104 tenders the warrant and warrant strike price ($30.00 in the example) to issuing company 102, and at step 415, issuing company 102 issues the common shares to investor 104.

At step 416, system 100 then determines whether the 90 day clock is still running, and if so, system 100 loops to step 416. If, at step 416, system 100 determines that the 90 day clock has expired, then at step 418 issuing company 102 pays investor 104 a preferred call price ($30.00 in the example). In one embodiment, the preferred call price and the warrant strike price are the same amount. This means that the holder of the warrant tenders the warrant strike price ($30.00) to exercise the warrant, and then 90 days later the issuer pays the holder the preferred call price ($30.00), which effectively cancels the two amounts.

Figure 5:
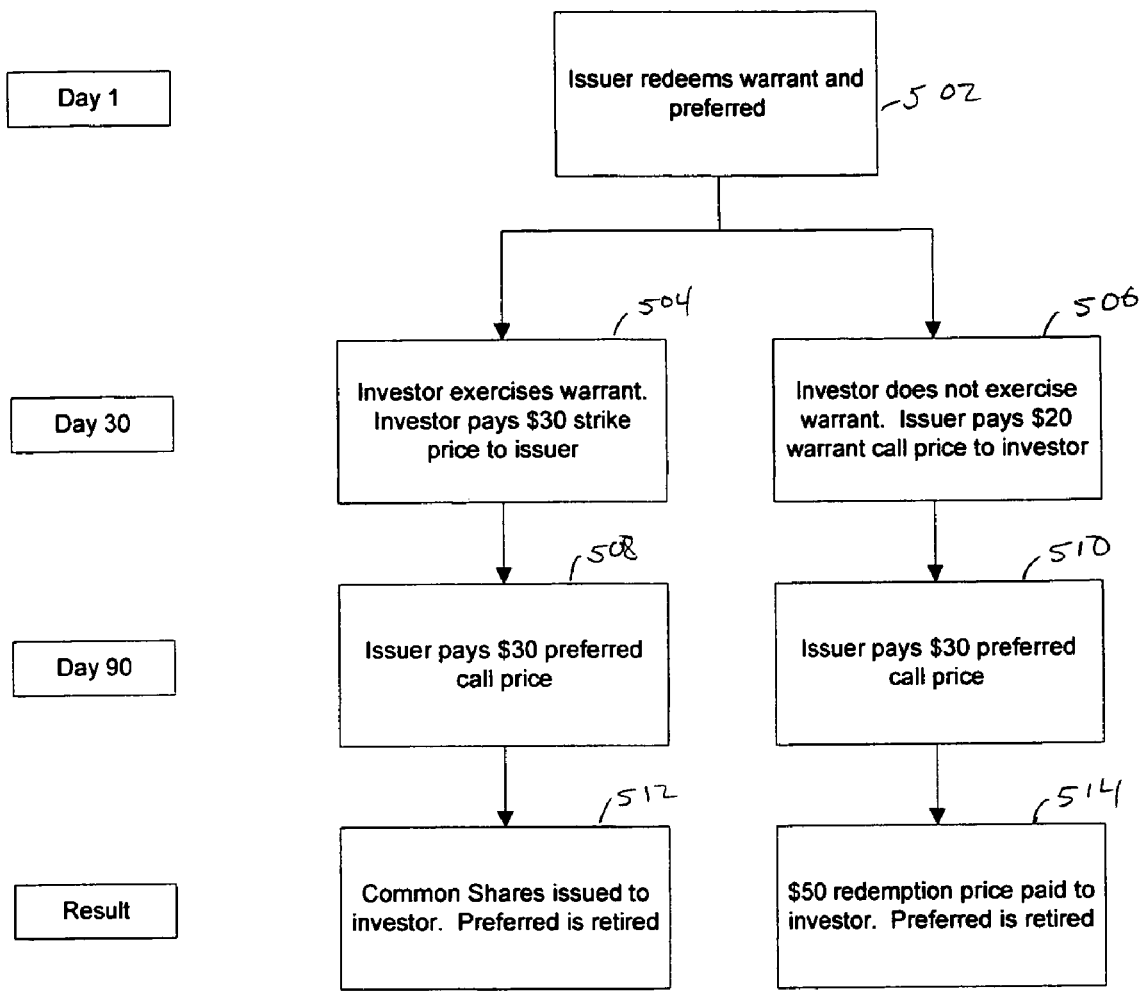
FIG. 5 illustrates a timeline for redemption in one embodiment.

Referring to FIG. 5, some of the steps described above are illustrated in relationship to time. On day 1, when issuing company 102 decides to redeem the instrument (502), the system starts a 30 day and 90 day clock. On or before day 30, investor 104 can exercise the warrant by tendering the warrant and the $30.00 warrant strike price (504) to issuing company 102. If investor 104 does not exercise the warrant (506), then on day 30 issuing company 102 pays a $20.00 warrant call price to investor 104. At day 90, issuing company 102 pays investor 104 the $30.00 preferred call price (508, 510). If the investor exercised the warrant, then common shares are issued to the investor (512), otherwise the investor has received the $20.00 warrant call price and the $30.00 preferred call price (514).

Further Embodiments

In one embodiment, the warrant has a maturity of many years, such as between 50 and 99 years.

In one embodiment the warrant and the preferred are technically separated. If the warrant is exercised, the preferred is redeemed within 90 days.

In one embodiment, the coupon can be brought down by addition of a provisional call at a small threshold (110 to 120%) above the conversion price, which guarantees share issuance if the call is exercised.

In one embodiment, the NEO Preferred is not puttable by the holder.

The example $50.00 amount paid by investors for a NEO Preferred, the $30.00 warrant strike price, the $30.00 preferred call price, and the $20.00 warrant call price are just that, and variations in the amounts are clearly envisioned.

As illustrated in FIG. 3, investors 104 do not have an opportunity to exercise the warrant until after the issuer no-redeem period expires. However, it is envisioned that in other embodiments, investor 104 can exercise the warrant at any time, even during the no-redeem period.

Advantages of NEO Preferred

A NEO Preferred has high equity credit financing, E bucket for the warrant, and D bucket for the preferred security by Moody's. Proceeds from the value of the warrant (40% in the example) are booked to additional paid in capital (APIC) on the balance sheet of the issuing company as equity, thereby receiving 100% equity credit. Proceeds from the value of the preferred (60% in the example) appear on the balance sheet of the issuing company as Preferred Stock, receiving D bucket treatment by Moody's. In the example, there is an overall implied equity credit of 70%. Further, there is better agency treatment because only the proceeds from the preferred (60% in the example) are liquidation preference. There is also speed to market because of the 144A offering format. Treasury stock method accounting for the warrant results in better earnings per share than traditional convertible preferred. There is also a lower dividend than traditional preferred, and the structure is both simple and transparent.

Although illustrative embodiments have been described herein in detail, it should be noted and will be appreciated by those skilled in the art that numerous variations may be made within the scope of this invention without departing from the principles of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A method implemented at least partially in a programmed computer for raising funds, the method comprising:

using the programmed computer to issue a financial instrument with two parts as a single unit that is issued directly by a company, wherein the two parts include a preferred security of the company as a first part of the single unit financial instrument, and a warrant allowing a holder of the single unit financial instrument to buy a common security of the company as a second part of the single unit financial instrument, the single unit financial instrument including a redemption right that is exercisable by the company on both the preferred security and the warrant of the single unit financial instrument;

using the programmed computer to redeem the preferred security and the warrant of the single unit financial instrument after issue;

receiving a warrant strike price from a holder of the single unit financial instrument; and using the programmed computer to calculate proceeds from the warrant as equity on a balance sheet of the company receiving full equity credit and to calculate proceeds from the preferred security as preferred stock on the balance sheet of the company, the preferred security proceeds having liquidation preference.

2. A method according to claim 1, wherein receiving the warrant strike price occurs a predetermined number of days after redeeming the single unit financial instrument.

3. A method according to claim 1, further comprising using the programmed computer to pay a preferred call price to the holder of the single unit financial instrument.

4. A method according to claim 3, wherein paying the preferred call price occurs a predetermined number of days after receiving the strike price.

5. A method according to claim 1, further comprising issuing the common security in the company to the holder of the single unit financial instrument.

6. A method according to claim 1, further comprising retiring the preferred security.

7. A method implemented at least partially in a programmed computer for raising funds, the method comprising:
   using the programmed computer to issue a financial instrument with two parts as a single unit that is issued directly by a company, wherein the two parts include a preferred security of the company as a first part of the single unit financial instrument, and a warrant allowing a holder of the single unit financial instrument to buy a common security of the company as a second part of the single unit financial instrument, the single unit financial instrument including a redemption right that is exercisable by the company on both the preferred security and the warrant of the single unit financial instrument;
   using the programmed computer to redeem the preferred security and the warrant of the single unit financial instrument after issue;
   receiving a warrant strike price from a holder of the single unit financial instrument within a first predetermined number of days after the company exercises the redemption right;
   using the programmed computer to pay a preferred call price to the holder of the single unit financial instrument within a second predetermined number of days after the company exercises the redemption right;
   delivering the common security to the holder of the single unit financial instrument; and
   using the programmed computer to calculate proceeds from the warrant as equity on a balance sheet of the company receiving full equity credit and to calculate proceeds from the preferred security as preferred stock on the balance sheet of the company, the preferred security proceeds having liquidation preference.

8. A computer-executable program tangibly embodied on a computer-readable medium as computer executable software code, the code for raising funds, the code comprising:
   code to issue a financial instrument with two parts as a single unit that is issued directly by a company, wherein the two parts include a preferred security of the company as a first part of the single unit financial instrument, and a warrant allowing a holder of the single unit financial instrument to buy a common security of the company as a second part of the single unit financial instrument, the single unit financial instrument including a redemption right that is exercisable by the company on both the preferred security and the warrant of the single unit financial instrument;
   code to redeem the preferred security and the warrant of the single unit financial instrument after issue;
   code to receive a warrant strike price from a holder of the single unit financial instrument; and
   code to calculate proceeds from the warrant as equity on a balance sheet of the company receiving full equity credit and to calculate proceeds from the preferred security as preferred stock on the balance sheet of the company, the preferred security proceeds having liquidation preference.

9. A programmed computer for raising funds, comprising:
   a memory having at least one region for storing computer executable program code; and
   a processor for executing the program code stored in the memory, wherein the program code comprises:
      code to issue a financial instrument with two parts as a single unit that is issued directly by a company, wherein the two parts include a preferred security of the company as a first part of the single unit financial instrument, and a warrant allowing a holder of the single unit financial instrument to buy a common security of the company as a second part of the single unit financial instrument, the single unit financial instrument including a redemption right that is exercisable by the company on both the preferred security and the warrant of the single unit financial instrument;
      code to redeem the preferred security and the warrant of the single unit financial instrument after issue;
      code to receive a warrant strike price from a holder of the single unit financial instrument; and
      code to calculate proceeds from the warrant as equity on a balance sheet of the company receiving full equity credit and to calculate proceeds from the preferred security as preferred stock on the balance sheet of the company, the preferred security proceeds having liquidation preference.

10. A method implemented at least partially in a programmed computer for raising funds, the method comprising:
    using the programmed computer to issue a financial instrument with two parts as a single unit that is issued directly by a company, wherein the two parts include a preferred security of the company as a first part of the single unit financial instrument, and a warrant allowing a holder of the single unit financial instrument to buy a common security of the company as a second part of the single unit financial instrument, the single unit financial instrument including a redemption right that is exercisable by the company on both the preferred security and the warrant of the single unit financial instrument;
    using the programmed computer to redeem the preferred security and the warrant of the single unit financial instrument after issue;
    using the programmed computer to pay a warrant call price to a holder of the single unit financial instrument; and
    using the programmed computer to calculate proceeds from the warrant as equity on a balance sheet of the company receiving full equity credit and to calculate proceeds from the preferred security as preferred stock on the balance sheet of the company, the preferred security proceeds having liquidation preference.

11. A method according to claim 10, wherein paying the warrant call price occurs a predetermined number of days after redeeming the single unit financial instrument.

12. A method according to claim 10, further comprising using the programmed computer to pay a preferred call price to the holder of the single unit financial instrument.

13. A method according to claim 12, wherein paying the preferred call price occurs a predetermined number of days after paying the warrant call price.

14. A method according to claim 10, further comprising retiring the preferred security.

15. A method implemented at least partially in a programmed computer for raising funds, the method comprising:

using the programmed computer to issue a financial instrument with two parts as a single unit that is issued directly by a company, wherein the two parts include a preferred security of the company as a first part of the single unit financial instrument, and a warrant allowing a holder of the single unit financial instrument to buy a common security of the company as a second part of the single unit financial instrument, the single unit financial instrument including a redemption right that is exercisable by the company on both the preferred security and the warrant of the single unit financial instrument;

using the programmed computer to redeem the preferred security and the warrant of the single unit financial instrument after issue;

using the programmed computer to pay a warrant call price to a holder of the single unit financial instrument within a first predetermined number of days after the company exercises the redemption right;

using the programmed computer to pay a preferred call price to the holder of the single unit financial instrument within a second predetermined number of days after the company exercises the redemption right; and using the programmed computer to calculate proceeds from the warrant as equity on a balance sheet of the company receiving full equity credit and to calculate proceeds from the preferred security as preferred stock on the balance sheet of the company, the preferred security proceeds having liquidation preference.

16. A computer-executable program tangibly embodied on a computer-readable medium as computer executable software code, the code for raising funds, the code comprising:

code to issue a financial instrument with two parts as a single unit that is issued directly by a company, wherein the two parts include a preferred security of the company as a first part of the single unit financial instrument, and a warrant allowing a holder of the single unit financial instrument to buy a common security of the company as a second part of the single unit financial instrument, the single unit financial instrument including a redemption right that is exercisable by the company on both the preferred security and the warrant of the single unit financial instrument;

code to redeem the preferred security and the warrant of the single unit financial instrument after issue;

code to pay a warrant call price to a holder of the single unit financial instrument; and code to calculate proceeds from the warrant as equity on a balance sheet of the company receiving full equity credit and to calculate proceeds from the preferred security as preferred stock on the balance sheet of the company, the preferred security proceeds having liquidation preference.

17. A programmed computer for raising funds, comprising:

a memory having at least one region for storing computer executable program code; and a processor for executing the program code stored in the memory, wherein the program code comprises:

code to issue a financial instrument with two parts as a single unit that is issued directly by a company, wherein the two parts include a preferred security of the company as a first part of the single unit financial instrument, and a warrant allowing a holder of the single unit financial instrument to buy a common security of the company as a second part of the single unit financial instrument, the single unit financial instrument including a redemption right that is exercisable by the company on both the preferred security and the warrant of the single unit financial instrument;

code to redeem the preferred security and the warrant of the single unit financial instrument after issue;

code to pay a warrant call price to a holder of the single unit financial instrument; and code to calculate proceeds from the warrant as equity on a balance sheet of the company receiving full equity credit and to calculate proceeds from the preferred security as preferred stock on the balance sheet of the company, the preferred security proceeds having liquidation preference.

\* \* \* \* \*